United States Patent Office 2,751,421
Patented June 19, 1956

2,751,421

STABILIZATION OF TRICHLOROETHYLENE

William O. Stauffer, Wilmington, Del., assignor to E. I. du Pont de Nemours and Company, Wilmington, Del., a corporation of Delaware No Drawing. Application February 18, 1954, Serial No. 411,289

8 Claims. (Cl. 260—652.5)

This invention relates to the stabilization of trichloroethylene and to stabilized trichloroethylene compositions suitable for a wide variety of uses, especially for extraction purposes.

Trichloroethylene is used widely as a solvent in extraction, dry cleaning and metal degreasing operations; in cold cleaning formulations; in adhesives; and in various coating compositions. It is well known that trichloroethylene, both during storage and in use for the above and other purposes, tends to undergo an oxidative type of decomposition due to contact with oxygen, with the formation of acidic products. Such decomposition is accelerated by heat, light, moisture and contact with metals.

The addition to trichloroethylene of various substances, including certain amines and phenols, has been proposed to render trichloroethylene more resistant to decomposition due to oxidation. The use of amines is disadvantageous in that they are dissipated by reaction with acids which the solvent may contact during normal use, and by acids formed in the solvent itself, e. g., through decomposition thereof. Furthermore, the resulting amine salts accelerate corrosion of metals, e. g., steel equipment. The phenols employed heretofore either have not been as effective as desired in stabilizing trichloroethylene against oxidative decomposition, or their presence in food products could not be tolerated, so that trichloroethylene containing them could not be used in the important food extraction field.

An object of the invention is to provide an improved trichloroethylene stabilizer which will effectively inhibit decomposition thereof due to oxidation. A further object is to provide an improved trichloroethylene composition which is substantially neutral, has a high stability against oxidative decomposition and which contains no stabilizer whose presence would make objectionable use of the composition in food processing operations, e. g. extractions. Other objects will be apparent from the following description.

These objects are accomplished in accordance with the invention by adding to trichloroethylene an effective or stabilizing amount of a t-butyl-4-hydroxyanisole. It has now been discovered that the t-butyl-4-hydroxyanisoles are exceptionally effective, even in extremely small amounts, in stabilizing trichloroethylene against decomposition due to oxidation. These compounds yield stabilized solvent compositions which are substantially neutral. Their presence in the solvent is not objectionable in the solvent processing of food products; in fact, they are employed commercially as additives for certain edible fats and oils.

Trichloroethylene stabilized with a t-butyl-4-hydroxyanisole possesses general utility for metal degreasing, dry cleaning and other well-known uses. It is outstanding for use in extracting fats and oils and the like, especially where contact with food products is intended. This is because of the neutral character and high effectiveness of the t-butyl-4-hydroxyanisoles as stabilizers, as well as the fact that their presence in the solvent is not objectionable in food processing operations. Prior phenol stabilizers such as p-t-amylphenol are unsuitable for this purpose for toxicity reasons. A t-butyl-4-hydroxyanisole may be employed as the sole stabilizer present in the trichloroethylene, or it may be combined with one or more stabilizers of other types whose presence is not objectionable. Thus, it may be combined with an additive whose primary function is to stabilize the trichloroethylene against thermal decomposition, particularly when the trichloroethylene is to be heated for long periods of time. An example of an additive which functions primarily as a thermal stabilizer is diisobutylene.

A test has been devised to measure the extent to which trichloroethylene will undergo oxidative decomposition under conditions simulating use conditions. In this test, a 200 ml. sample of the trichloroethylene to be tested is refluxed for 4 hours in the presence of 0.1 g. of iron powder with a stream of oxygen bubbling through the sample. The sample is irradiated by an ultraviolet lamp during the reflux period and the condensate is returned to the boil flask through a 50 ml. water layer contained in a modified Soxhlet extractor. The total acidity developed in the water and solvent is titrated at the end of the test and calculated as milliliters of normal HCl.

In typical tests carried out as described above, three samples of unstabilized trichloroethylene developed acidities equivalent to 12.5, 14.1 and 11.9 ml. of N HCl. In comparison, two samples of the same trichloroethylene containing 0.01% by weight of a mixture of t-butyl-4-hydroxyanisoles, when tested under identical conditions, developed acidities equivalent to only 0.08 and 0.10 ml. N HCl.

The stabilizer used above and in the tests described below was a commercial mixture of 2- and 3-t-butyl-4-hydroxyanisoles in which the 3-isomer was present in a predominating amount. The structural formulae of these isomers are:

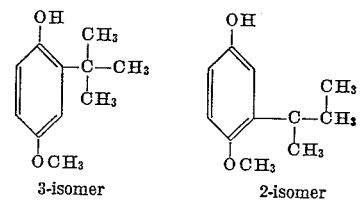

3-isomer        2-isomer

Either isomer is effective for the present purposes but since they are usually sold commercially as a mixture of the two, use of such mixtures will generally be most practical. The abbreviation "BHA" is hereinafter used to designate a mixture of the above butylhydroxyanisoles.

The above test was repeated on a number of samples of trichloroethylene from the same unstabilized stock. There were added to the samples the amounts of BHA indicated in Table I. Each sample also contained 0.3% diisobutylene. The test results are shown in Table I.

Table I

| Percent BHA | No. of Tests Made | Ml. N HCl Formed | |
|---|---|---|---|
| | | Range | Average |
| 0.01 | 8 | 0.016–0.120 | 0.048 |
| 0.005 | 8 | 0.016–0.092 | 0.052 |
| 0.0025 | 4 | 0.094–0.203 | 0.146 |
| 0.0013 | 4 | 0.038–0.177 | 0.112 |
| 0.0007 | 2 | 0.044–0.092 | 0.068 |

Experience has shown that although the heat applied under the above test conditions does accelerate oxidative decomposition, the temperature is not high enough nor sufficiently prolonged to cause significant thermal decomposition; hence, the diisobutylene present probably had no significant effect on the above test results. Diisobutylene alone has some slight anti-oxidant effect but not enough to influence significantly the results with BHA. The results reported in Table I demonstrate that BHA is highly effective in stabilizing trichloroethylene against oxidative decomposition, even though present in very small amounts.

Triethylamine and p-t-amylphenol, either alone or in combination, have been regarded heretofore as outstanding stabilizers against decomposition due to oxidation. However, when tested by the procedure described above, two samples of trichloroethylene to which 0.02% of triethylamine had been added developed acidities of 5.96 and 6.03 ml. of N HCl, while two samples to which 0.02% of triethylamine and 0.01% of p-t-amylphenol had been added developed acidities of 9.44 and 10.66 ml. N HCl. These results should be compared with those shown in Table I.

A further comparison of the relative effectiveness of triethylamine and BHA as stabilizers is provided by another test in which a mixture of trichloroethylene (100 ml.) and water (100 ml.) is boiled under reflux for 12 days in the presence of a strip of mild steel in contact with both the liquid and vapor phases. The amount of acidity developed in the water layer and the weight loss of the steel strip are then determined.

Duplicate samples (A) of trichloroethylene to which had been added 0.01% of triethylamine and 0.3% of diisobutylene were tested as described above, along with duplicate samples (B) of trichloroethylene to which had been added 0.01% of BHA and 0.3% of diisobutylene. The results of these tests are reported in Table II.

*Table II*

| Sample | Acidity In Water Layer [1] | Loss in Wt. of Steel Strip, Percent |
|---|---|---|
| A (1) | 16.9 | 1.35 |
| (2) | 20.1 | 1.84 |
| Ave | 18.5 | 1.59 |
| B (1) | 4.3 | 1.01 |
| (2) | 6.0 | 1.12 |
| Ave | 5.1 | 1.06 |

[1] Titer to pH 7, in milliliters of 0.01 N NaOH.

The results of Table II show that acid formation in the BHA stabilized solvent was only about one-third that formed in the triethylamine stabilized solvent. They also show that stabilization with BHA reduced corrosion of the steel to only about two-thirds that occurring when the stabilizer is triethylamine. These results are significant since, in use, trichloroethylene is often heated in contact with water in steel equipment.

The present stabilizers exert a substantial stabilizing effect when present in concentrations as low as 0.0001% based on the weight of the trichloroethylene. However, concentrations in the range 0.001 to 0.05% are generally preferred. Larger amounts, e. g., up to 1% and higher, can, of course, be used but no added advantage generally results from such larger amounts.

Trichloroethylene compositions stabilized in accordance with the invention are outstandingly suitable for use in food processing operations, e. g., in solvent extractions, in which they become contacted with products intended for use as foods. This is due to the high effectiveness of the present stabilizers, their substantial neutral character, and also to the fact that contact of food products with solvent containing the present stabilizers, at least in the preferred concentrations, is unobjectionable. The compositions are also suitable for a wide variety of other uses, particularly where a high quality solvent, e. g., one containing only small amounts of stabilizer, is desirable. For some uses where exposure of the trichloroethylene to heat for long periods is encountered, the use, in combination with the present stabilizer, of an additive such as diisobutylene which is an effective stabilizer against thermal decomposition, may be desirable.

I claim:

1. A composition comprising trichloroethylene and a stabilizing amount of a t-butyl-4-hydroxyanisole.

2. A composition comprising trichloroethylene and from 0.0001 to 1%, based on the weight of said trichloroethylene, of a t-butyl-4-hydroxyanisole.

3. A composition comprising trichloroethylene and from 0.001 to 0.05%, based on the weight of said trichloroethylene, of a t-butyl-4-hydroxyanisole.

4. A composition comprising trichloroethylene and from 0.001 to 0.05%, based on the weight of said trichloroethylene, of a mixture of 2-t-butyl-4-hydroxyanisole and 3-t-butyl-4-hydroxyanisole.

5. A method for stabilizing trichloroethylene comprising adding thereto a stabilizing amount of a t-butyl-4-hydroxyanisole.

6. A method for stabilizing trichloroethylene comprising adding thereto from 0.0001 to 1%, based on the weight of said trichloroethylene, of a t-butyl-4-hydroxyanisole.

7. The method for stabilizing trichloroethylene comprising adding thereto from 0.001 to 0.05%, based on the weight of said trichloroethylene, of a t-butyl-4-hydroxyanisole.

8. The method of stabilizing trichloroethylene comprising adding thereto from 0.001 to 0.05%, based on the weight of said trichloroethylene, of a mixture of 2-t-butyl-4-hydroxyanisole and 3-t-butyl-4-hydroxyanisole.

References Cited in the file of this patent

UNITED STATES PATENTS

| | | |
|---|---|---|
| 2,008,680 | Carlisle et al. | July 23, 1935 |
| 2,136,333 | Coleman et al. | Nov. 8, 1938 |
| 2,155,723 | Levine et al. | Apr. 25, 1939 |
| 2,181,102 | Stoesser et al. | Nov. 21, 1939 |
| 2,319,261 | Pitman | May 18, 1943 |